(12) United States Patent
Kwon et al.

(10) Patent No.: US 9,826,744 B2
(45) Date of Patent: *Nov. 28, 2017

(54) COOKING APPARATUS HAVING DIVIDER STORAGE PORTION

(71) Applicant: SAMSUNG ELECTRONICS CO., LTD., Suwon-si, Gyeonggi-do (KR)

(72) Inventors: Myoung Keun Kwon, Seoul (KR); Won Ic Tae, Yongin-si (KR); Hyung Jin Kim, Suwon-si (KR); Jae Min Ko, Seoul (KR); Pung Yeun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 62 days.

This patent is subject to a terminal disclaimer.

(21) Appl. No.: 14/820,034

(22) Filed: Aug. 6, 2015

(65) Prior Publication Data

US 2015/0338106 A1    Nov. 26, 2015

Related U.S. Application Data

(63) Continuation of application No. 13/339,496, filed on Dec. 29, 2011, now Pat. No. 9,125,420.

(30) Foreign Application Priority Data

Apr. 26, 2011    (KR) .................. 10-2011-0039168

(51) Int. Cl.
*F24C 15/16*    (2006.01)
*F24C 7/06*    (2006.01)
(Continued)

(52) U.S. Cl.
CPC ............... *A21B 1/00* (2013.01); *A47B 81/00* (2013.01); *F24C 7/06* (2013.01); *F24C 15/16* (2013.01); *F24C 15/18* (2013.01)

(58) Field of Classification Search
CPC .. F24C 7/00; F24C 7/06; F24C 15/007; F24C 15/16
(Continued)

(56) References Cited

U.S. PATENT DOCUMENTS 1,431,953 A    10/1922    Henoch
1,932,003 A    10/1933    West
(Continued)

FOREIGN PATENT DOCUMENTS

JP    53-104169    8/1978
JP    62-76816    5/1987
(Continued)

OTHER PUBLICATIONS

U.S. Office Action dated Feb. 14, 2014 in copending U.S. Appl. No. 13/339,496.
(Continued)

*Primary Examiner* — Reginald L Alexander
(74) *Attorney, Agent, or Firm* — Staas & Halsey LLP

(57) ABSTRACT

A cooking apparatus includes a main body; a cooking chamber defined in the main body; a removable divider designed to be placed in the cooking chamber to partition the cooking chamber; a drawer, which has a storage space therein, to be slidably extracted and retracted; a drawer receiving space defined beneath the cooking chamber to receive the drawer; a divider storage space arranged between the cooking chamber and the drawer receiving space to store the divider removed from the cooking chamber; and an insulation member provided between the cooking chamber and the divider storage space. The divider storage space is accessible while the drawer is open.

18 Claims, 7 Drawing Sheets

(51) Int. Cl.
    *A21B 1/00*     (2006.01)
    *A47B 81/00*     (2006.01)
    *F24C 15/18*     (2006.01)

(58) Field of Classification Search
    USPC ............... 99/467, 449, 448; 219/394, 395;
              126/339, 273 R, 275 E, 275 R, 20.1, 332,
                 126/337 R, 337 A; 312/400, 408, 410
    See application file for complete search history.

(56) References Cited

U.S. PATENT DOCUMENTS

| | | |
|---|---|---|
| 2,130,168 A | 9/1938 | Weiskittel |
| 2,222,065 A | 11/1940 | Blakeslee |
| 2,276,692 A | 3/1942 | Hardwick |
| 2,625,928 A | 1/1953 | Gould |
| 6,545,251 B2 | 4/2003 | Allera et al. |
| 7,442,901 B2 | 10/2008 | Kim et al. |
| 2006/0289435 A1 | 12/2006 | Park |
| 2010/0006085 A1 | 1/2010 | Thomas et al. |

FOREIGN PATENT DOCUMENTS

| | | |
|---|---|---|
| KR | 10-2004-0057734 | 7/2004 |
| KR | 10-2006-0015090 | 2/2006 |

OTHER PUBLICATIONS

U.S. Office Action dated Jul. 25, 2014 in copending U.S. Appl. No. 13/339,496.
U.S. Office Action dated Dec. 5, 2014 in copending U.S. Appl. No. 13/339,496.
U.S. Notice of Allowance dated Aug. 14, 2015 in copending U.S. Appl. No. 13/339,496.
U.S. Appl. No. 13/339,496, filed Dec. 29, 2011, Myoung Keun Kwon, Samsung Electronics Co., Ltd.
Korean Office Action dated Apr. 12, 2017 in corresponding Korean Patent Application No. 10-2011-0039168.
Korean Notice of Allowance dated Sep. 29, 2017 in related Korean Application No. 10-2011-0039168.

COOKING APPARATUS HAVING DIVIDER STORAGE PORTION

CROSS-REFERENCE TO RELATED APPLICATIONS

This application is a continuation of U.S. application Ser. No. 13/339,496 filed on Dec. 29, 2011, which claims the priority benefit of Korean Patent Application No. 10-2011-0039168 filed on Apr. 26, 2011 in the Korean Intellectual Property Office, the disclosures of which are incorporated herein by reference in their entirety.

BACKGROUND

1. Field

Embodiments of the present invention relate to a cooking apparatus having a divider detachably mounted in a cooking chamber.

2. Description of the Related Art

In general, a cooking apparatus includes a cooking chamber and a heat source emitting heat into the cooking chamber so as to cook food with heat emitted from the heat source. Such a cooking apparatus is also provided with a divider to partition the cooking chamber, in order to easily apply a variety of temperature conditions in the cooking chamber or to prevent the entire cooking chamber from being used unnecessarily while cooking a small quantity of food.

A separate heat source and blowing fan are provided in each cooking chamber partitioned by the divider, so that each cooking chamber may be operated independently.

A user may use the cooking chamber in a partitioned state by placing the divider in the cooking chamber or in a non-partitioned state by removing the divider from the cooking chamber as necessary. Conventionally, a user stores the divider in a separate space outside the cooking apparatus when the divider is removed from the cooking chamber.

SUMMARY

Therefore, it is an aspect of the present invention to provide a cooking apparatus which includes a removable divider in a cooking chamber and a divider storage portion capable of storing the divider within the cooking apparatus without storing the divider outside of the cooking apparatus when the divider is removed from the cooking chamber.

Additional aspects of the invention will be set forth in part in the description which follows and, in part, will be obvious from the description, or may be learned by practice of the invention.

In accordance with one aspect of the present invention, a cooking apparatus includes a main body, a cooking chamber defined in the main body, a removable divider designed to be placed in the cooking chamber to partition the cooking chamber, a drawer which has a storage space therein to be slidably extracted and retracted, a drawer receiving space defined beneath the cooking chamber in the main body to receive the drawer, and a divider storage portion arranged adjacent to the drawer receiving space to store the divider.

The divider may have insulating properties to prevent heat transfer between the cooking chambers partitioned by the divider.

The divider stored in the divider storage portion may be not exposed to the outside of the main body while the drawer is in a closed state.

The divider storage portion may include a divider storage space, a divider housing defining the divider storage space, and a pair of support ribs arranged at respective lateral sides of the divider storage space to guide the divider into the divider storage space and support the divider.

The divider housing may be fixably coupled to the main body.

Each of the support ribs may include a guide portion which protrudes forward from the divider storage space and has a slanted shape so as to smoothly guide the divider into the divider storage space, and a support portion having a flat shape to support the divider retracted into the divider storage space.

Further, each of the support ribs may include a support wall upwardly protruding to guide the divider to be retracted into the divider storage space.

Each of the support ribs may be fixably coupled to the main body.

The cooking apparatus may further include a bake heater installed between the cooking chamber and the drawer receiving space to emit heat into the cooking chamber.

Also, the cooking apparatus may further include an insulating portion formed between the bake heater and the divider storage portion to prevent heat emitted from the bake heater from being transferred to the divider storage portion.

The insulating portion may include an insulating plate and an air barrier defined between the insulating plate and the divider housing of the divider storage portion.

The insulating portion may further include at least one flow hole formed at a side surface of the air barrier to allow air to flow into and out of the air barrier.

In accordance with another aspect of the present invention, a cooking apparatus includes a main body, a cooking chamber defined in the main body, a divider detachably mounted in the cooking chamber to partition the cooking chamber, and a divider storage portion formed in the main body space so that the divider removed from the cooking chamber is slidably retracted and stored therein.

The divider storage portion may include a divider storage space and a pair of support ribs arranged at respective lateral sides of the divider storage space to guide the divider into the divider storage space and support the divider.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
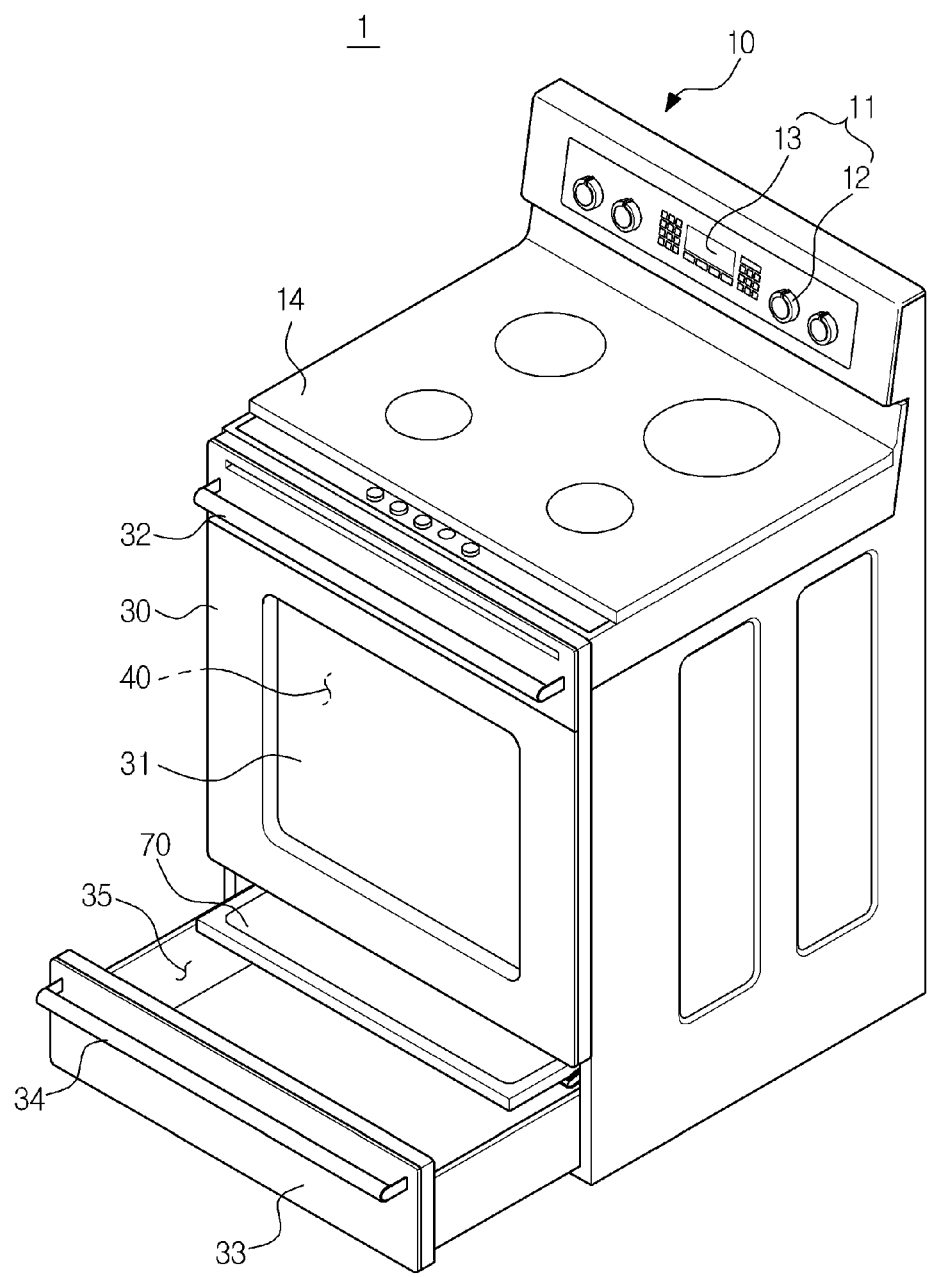
FIG. 1 is a perspective view illustrating an external appearance of a cooking apparatus according to an exemplary embodiment of the present invention.

Reference will now be made in detail to the embodiments of the present invention, examples of which are illustrated in the accompanying drawings, wherein like reference numerals refer to like elements throughout.

Hereinafter, exemplary embodiments of the present invention will be described with reference to the accompanying drawings. FIG. 1 is a perspective view illustrating an external appearance of a cooking apparatus according to an exemplary embodiment of the present invention.

Referring to FIG. 1, the cooking apparatus 1 includes a main body 10 defining an external appearance thereof, a cooking table 14 which is arranged at an upper portion of the main body 10 and on which food is placed to be cooked, and an operation panel 11. The operation panel 11 may be provided with a display 13 to display a variety of cooking information and an operation knob 12 to allow a user to set a variety of cooking modes.

A cooking chamber 40, in which food is sealed and cooked, is provided at a central portion of the main body 10. The cooking chamber 40 has a substantially rectangular shape while being opened at a front thereof. The front of the cooking chamber 40 is opened and closed by a door 30 with a door handle 32.

Figure 2:
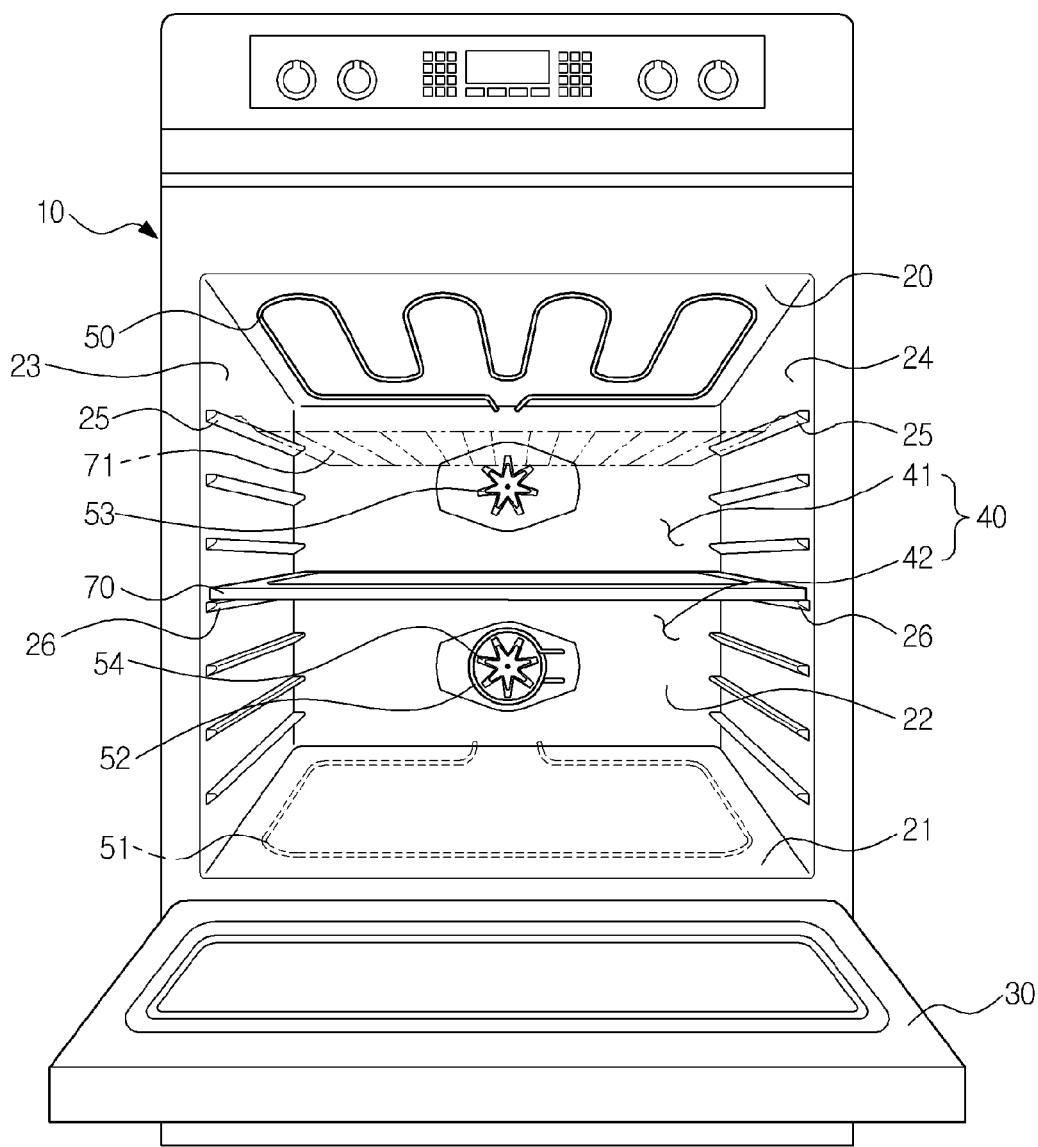
FIG. 2 is a front view illustrating an interior of the cooking chamber of FIG. 1.

A lower portion of the door 30 is joined to the main body 10 by a hinge so that the door 30 is pivoted frontward to open and close the front of the cooking chamber 40 (see FIG. 2). A transparent window 31 made of a transparent material such as glass, for example, is provided at the door 30 so that a cooking process of food in the cooking chamber 40 may be seen from the outside through the door 30.

A drawer 33 having a storage space 35 is installed beneath the cooking chamber 40 to store cooking utensils or a small quantity of food, for example. The drawer 33 is arranged so as to be slidably extracted from and retracted into the main body 10. Accordingly, a user may extract the drawer 33 from and retract the drawer 33 into the main body 10 while gripping a drawer handle 34.

Reference numeral 70 in FIG. 1 denotes a divider 70. The divider 70 may be detachably mounted in the cooking chamber 40 to partition the cooking chamber 40. FIG. 1 shows a state in which the divider 70 is extracted from or retracted into a divider storage portion 72 (see FIG. 3) arranged above a drawer receiving space 36 (see FIG. 3).

FIG. 2 is a front view illustrating an interior of the cooking chamber of FIG. 1. Also, FIG. 2 shows a state in which the divider 70 and a tray 71 are arranged in the cooking chamber 40.

Referring to FIG. 2, the main body 10 includes a top plate 20, a bottom plate 21, a back plate 22, and opposite side plates 23 and 24 to form the cooking chamber 40. That is, the cooking chamber 40 is defined by the top plate 20, the bottom plate 21, the back plate 22, and the opposite side plates 23 and 24 of the main body 10. The front of the cooking chamber 40 is shown as opened.

The tray 71, on which food is placed to be cooked, may be included in the cooking chamber 40. The tray may include a wire rack.

A plurality of support bars 25 and 26 is formed at the opposite side plates 23 and 24 to locate the tray 71 in the cooking chamber 40. A user may use the tray 71 after locating the tray 71 on desired pairs of the plural support bars 25 and 26, considering the size of food, for example.

Meanwhile, the divider 70 may be arranged in the cooking chamber 40 to partition the cooking chamber 40 into a first cooking chamber 41 and a second cooking chamber 42. The divider 70 has a size and shape corresponding to a horizontal cross section of the cooking chamber 40 to prevent heat transfer between the first cooking chamber 41 arranged at an upper position and the second cooking chamber 42 arranged at a lower position. The divider 70 may be made of an insulating material such as tempered glass, for example, and an edge of the divider 70 may be reinforced, such as coated with a material such as stainless steel, for example.

Such a divider 70 may be located on desired pairs of the plural support bars 25 and 26 formed at the opposite side plates 23 and 24. For example, the support bars 26 may be arranged at the middles of the opposite side plates 23 and 24. A support groove 27 may be formed to protrude from the back plate 22 of the main body 10 into the cooking chamber 40 to support the divider 70 (see FIG. 3).

Meanwhile, the main body 10 is provided with a broil heater 50 to emit heat into the first cooking chamber 41 and a bake heater 51 to emit heat into the second chamber 42. The broil heater 50 is mounted on a lower side of the top plate 20 to be exposed toward the first cooking chamber 41, whereas the bake heater 51 is concealed beneath the bottom plate 21 to prevent from being damaged due to the falling of food, for example.

Also, an upper convection fan 53 and a lower convection fan 54 are respectively arranged at the rears of the first and second cooking chambers 41 and 42 so that food is cooked by circulating air in the cooking chamber through convection.

Here, a convection heater 52 having a substantially circular shape is additionally provided around the lower convection fan 54 of the second cooking chamber 42. Consequently, various temperatures are easily applied in the first and second cooking chambers 41 and 42 since the second cooking chamber 42 further includes an additional heat source, compared to the first cooking chamber 41.

Figure 3:
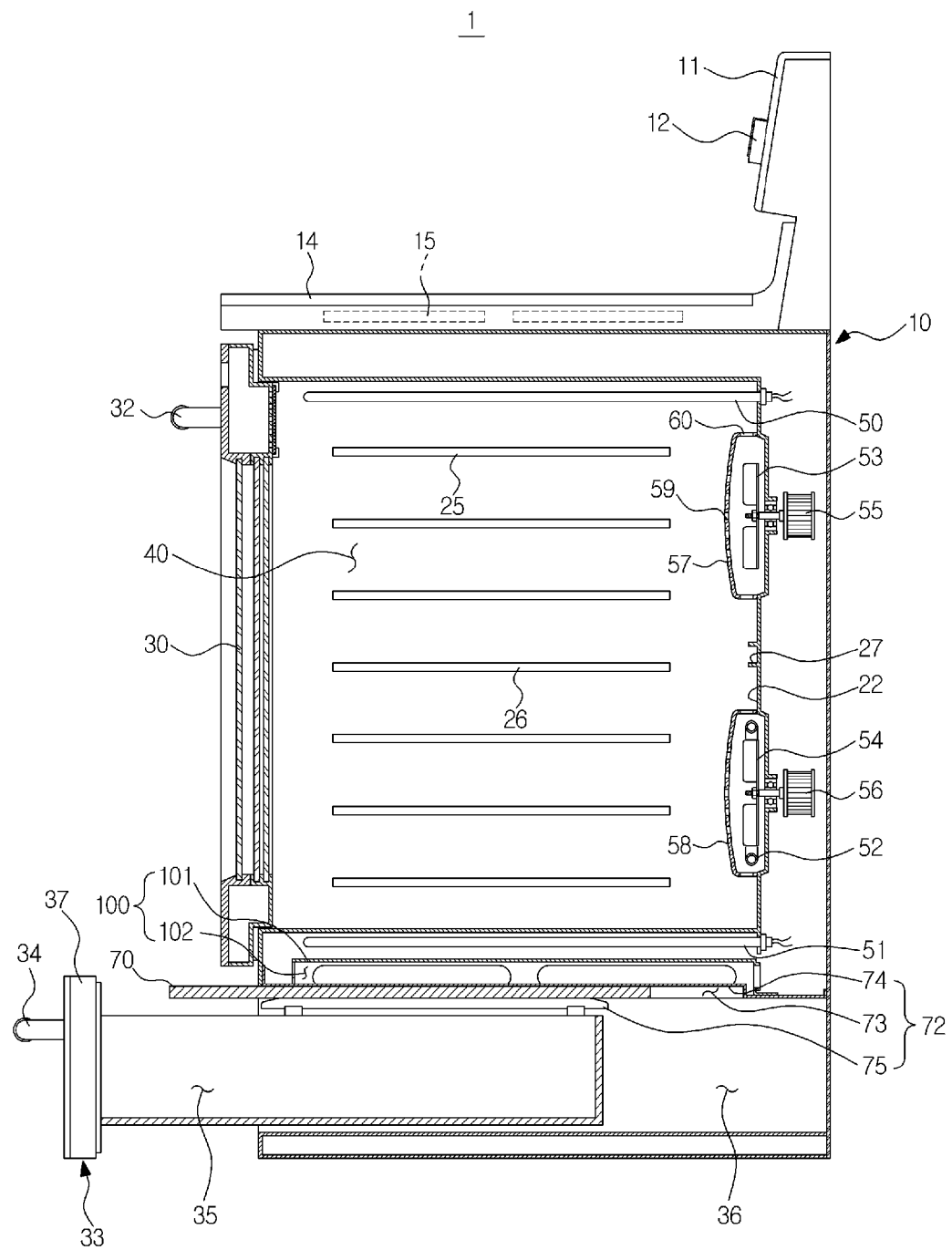
FIG. 3 is a side sectional view of FIG. 1.
Figure 4:
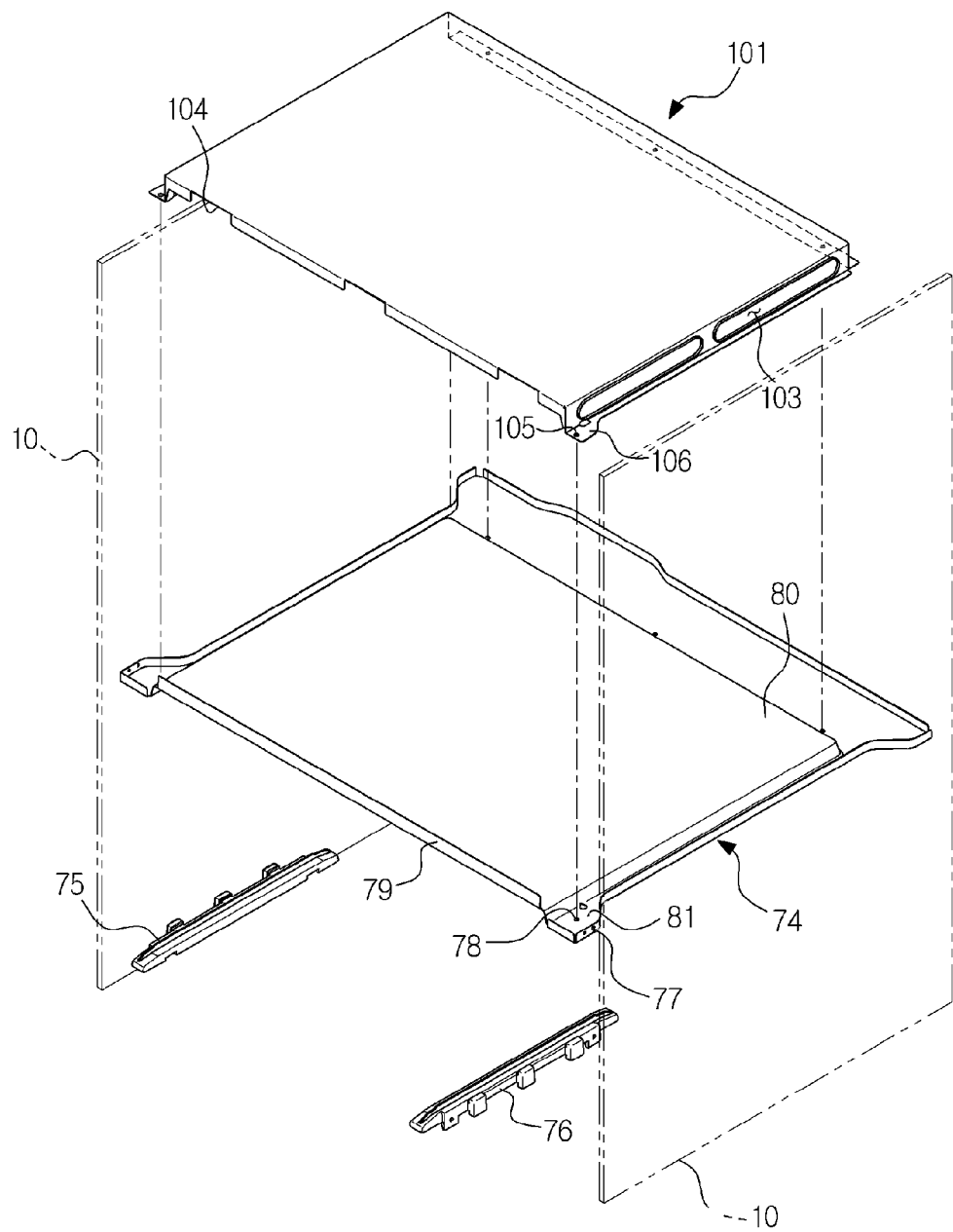
FIG. 4 is an exploded perspective view illustrating a divider storage portion and an insulating portion of FIG. 3.
Figure 5:
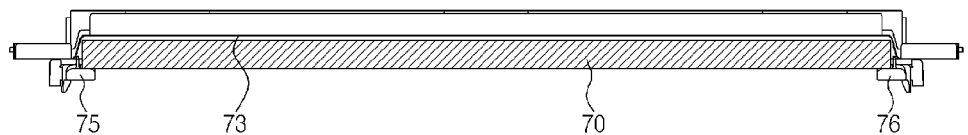
FIG. 5 is a front view illustrating the divider storage portion and the insulating portion of FIG. 3.
Figure 6:
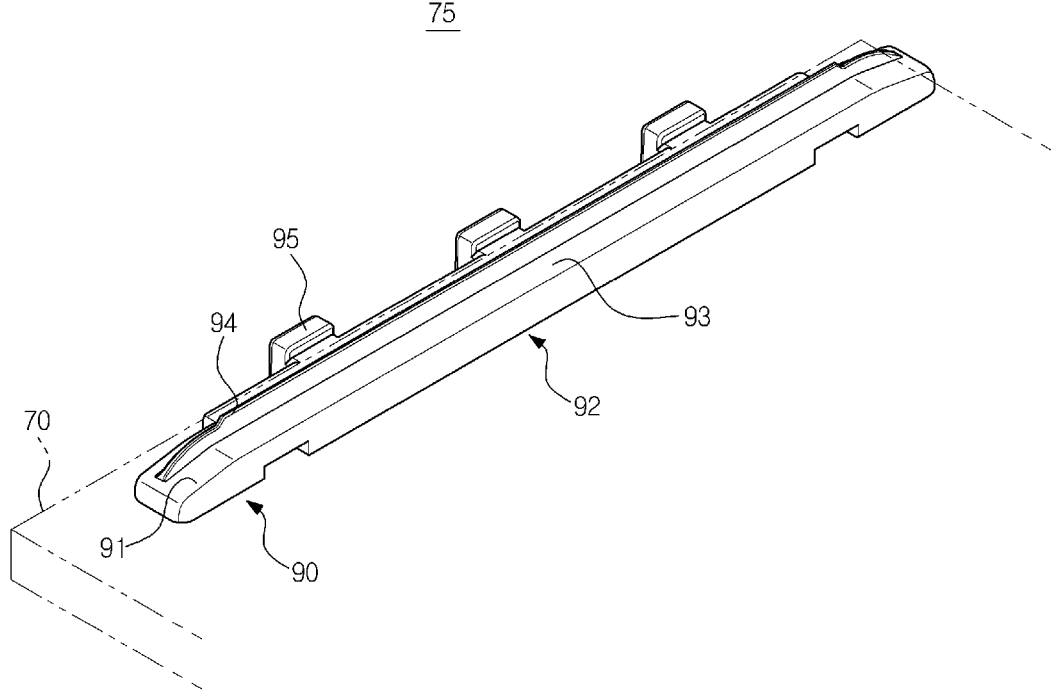
FIG. 6 is a perspective view illustrating support ribs of the divider storage portion of FIG. 3.
Figure 7:
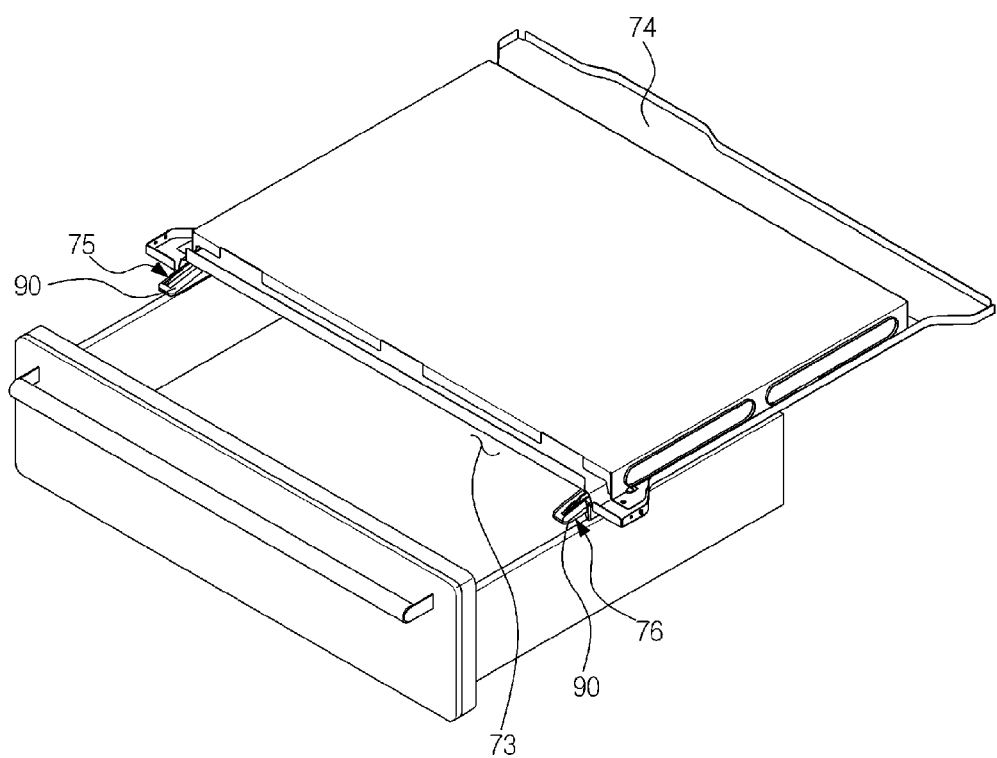
FIG. 7 is a perspective view illustrating principal components of the divider storage portion and the insulating portion of FIG. 3.

FIG. 3 is a side sectional view of FIG. 1. FIG. 4 is an exploded perspective view illustrating the divider storage portion and an insulating portion of FIG. 3. FIG. 5 is a front view illustrating the divider storage portion and the insulating portion of FIG. 3. FIG. 6 is a perspective view illustrating support ribs of the divider storage portion of FIG. 3. FIG. 7 is a perspective view illustrating principal components of the divider storage portion and the insulating portion of FIG. 3.

Referring to FIG. 3, an upper casing 57 and a lower casing 58 are respectively installed around the upper and lower convection fans 53 and 54 to prevent the fans 53 and 54 from being damaged due to suction of foreign materials, for example. Inlet holes 59 to suck air and outlet holes 60 to discharge air are formed at each of the upper and lower casings 57 and 58. Further, the main body 10 is provided with an upper motor 55 and a lower motor 56 to drive the upper and lower convection fans 53 and 54, respectively.

Referring to FIGS. 3 and 4, the cooking apparatus according to an exemplary embodiment of the present invention includes the divider storage portion 72 to store the divider 70 separated from the cooking chamber 40 and the insulating portion 100 to prevent heat emitted from the bake heater 51 from being transferred to the divider storage portion 72. The divider storage portion 72 may be arranged in the drawer receiving space 36 provided at the lower portion of the main body 10 to receive the drawer 33. On the other hand, the divider storage portion 72 may be arranged above the drawer receiving space 36 so that the divider 70 is covered with a head portion 37 of the drawer 33 when the drawer 33 is retracted into the drawer receiving space 36.

Although not shown as such, the head portion 37 of the drawer 33 may also have a height slightly lower than that of the divider storage portion 72 to expose the divider storage portion 72 to the outside so that the divider 70 may be extracted and retracted without extraction of the drawer 33.

Alternatively, the divider storage portion 72 may be arranged beneath the drawer receiving space 36.

The divider storage portion 72 includes a divider storage space 73 to store the divider 70, a divider housing 74 to define the divider storage space 73, and support ribs 75 and 76 to guide and support the divider 70 to be retracted into the divider storage space 73. The divider storage space 73 is a space to store the divider 70, and is substantially similar to or slightly greater than a shape of the divider 70. The tray 71 (see FIG. 2) as well as the divider 70 may be stored in the divider storage space 73.

Reference numeral 15 in FIG. 3 denotes a cooking table heater 15 to heat food placed on the cooking table 14.

The divider housing 74 defining the divider storage space 73 may be formed of a single plate. The divider housing 74 includes a raised portion 80 which is upwardly lifted, and the divider storage space 73 is formed beneath the raised portion 80. Therefore, the raised portion 80 defines an upper side, a rear side, and lateral sides of the divider storage space 73.

Further, a guide wall 79 may be formed by upwardly bending a front edge of the raised portion 80 to guide the divider 70 into the divider storage space 73. The configuration of the divider housing 74 is not limited to the present embodiment. For example, the divider housing 74 may be formed by coupling a plurality of plates to define a divider storage space between the plural plates.

Also, the divider housing 74 includes first coupling portions 81 which protrude laterally. Fastening holes 77 and a first coupling hole 78 are formed at each of the first coupling portions 81. The divider housing 74 is coupled to the main body 10 through fastening holes 77, and the divider housing 74 is coupled to an insulating plate 101 described below through the first coupling hole 78. Accordingly, the divider housing 74 may be fixably coupled to the main body 10 through the fastening holes 77.

Meanwhile, as shown in FIG. 5, a pair of support ribs 75 and 76 is provided. The support ribs 75 and 76 are arranged respectively beneath left and right sides of the divider storage space 73 to support the divider 70 inserted into the divider storage space 73. Since the support ribs 75 and 76 are a symmetrical shape, only one support rib 75 will be described below.

Referring to FIGS. 6 and 7, the support rib 75 has a substantially elongated bar shape. The support rib 75 includes a guide portion 90 to guide the divider 70 into the divider storage space 73 and a support portion 92 to support the divider 70.

An upper surface 93 of the support portion 92 is formed in a flat shape so that the support portion 92 stably supports the divider 70. An upper surface 91 of the guide portion 90 has a slightly slanted shape. The upper surface 91 of the guide portion 90 may be slanted in an upward direction as going from the end of the guide portion 90 toward the support portion 92. Also, the guide portion 90 is arranged at a position which slightly protrudes forward from the divider storage space 73.

In accordance with such a configuration, the position where the divider 70 is retracted into the divider storage space 73 may be easily determined, so that the divider 70 may be smoothly retracted into the divider storage space 73.

A support wall 94 is formed at the upper surfaces of the support portion 92 and the guide portions 90 to support a side surface of the divider 70. Thus, the support wall 94 defines a portion of the corresponding side of the divider storage space 73. A plurality of coupling protrusions 95 may be formed at one side of the support rib 75 so that the support rib 75 is coupled to the main body 10. As a result, the support rib 75 may be securely coupled to a side surface of the main body 10 through the coupling protrusions 95.

Meanwhile, in an exemplary embodiment, the support ribs 75 and 76 coupled to the respective side surfaces of the main body 10 are used to support the divider 70. However, a structure other than the support ribs 75 and 76 may be used to support the divider 70, such as a support plate having substantially the same size as the divider 70, for example.

Hereinafter, the insulating portion 100 according to an exemplary embodiment of the present invention will be described with reference again to FIGS. 3 and 4.

The insulating portion 100 is located between the bake heater 51 and the divider storage portion 72 to prevent heat emitted from the bake heater 51 from being transferred to the divider storage portion 72. Also, the insulating portion 100 includes an insulating plate 101 and an air barrier 102. That is, the insulating plate 101 defines an upper side of the air barrier 102, whereas the divider housing 74 of the divider storage portion 72 defines a lower side of the air barrier 102. The insulating plate 101 may be formed as a single plate with bent edges. The bent edges define an upper surface, a front surface, a rear surface, and lateral side surfaces of the air barrier 102.

A plurality of flow holes 104 and 103 are formed at the edges of the insulating plate 101 defining the front surface, the rear surface, and the lateral side surfaces of the air barrier 102 so that air flows into and out of the air barrier 102 through the flow holes 104 and 103. As a result, the air continuously flows into and out of the air barrier 102, thereby emitting heat to the outside.

The insulating plate 101 includes second coupling portions 106. A second coupling hole 105 is formed at each of the second coupling portions 106 so that the insulating plate 101 is coupled to the divider housing 74. Accordingly, the insulating plate 101 may be fixably coupled to the divider housing 74 through the second coupling hole 105, thereby defining the air barrier 102.

In accordance with the configuration of the insulating portion 100, heat may be prevented from being transferred to the divider 70 stored in the divider storage portion 72, so that the divider 70 stored in the divider storage portion 72 may be kept at room temperature. Therefore, a user may safely extract the divider 70 from the divider storage portion 72.

Heretofore, the configuration of the cooking apparatus according to an exemplary embodiment of the present invention has been described. Hereinafter, a cooking mode using the cooking apparatus according to an exemplary embodiment of the present invention will be simply described with reference to FIG. 2.

If desired, a user may use the cooking chamber 40 in a partitioned state, wherein the first and second cooking chambers 41 and 42 are partitioned, by mounting the divider 70 in the cooking chamber 40. In this case, in order to apply a variety of temperature conditions in the first and second cooking chambers 41 and 42, a user may operate only a portion or all of the broil heater 50, the upper convection fan 53, the bake heater 51, the convection heater 52, and the lower convection heater 54. That is, a user may operate the broil heater 50 and the upper convection fan 53, operate the bake heater 51, the convection heater 52, and the lower convection heater 54, or operate the broil heater 50, the upper convection fan 53, the bake heater 51, the convection heater 52, and the lower convection heater 54.

Also, a user may cook food using the entirety of the cooking chamber 40 by removing the divider 70 from the cooking chamber 40. In this case, the removed divider 70 may be stored in the divider storage portion 72 which is arranged above the drawer receiving space 36.

As is apparent from the above description, in accordance with aspects of the present invention, when the divider is removed from the cooking chamber, the removed divider may be stored within the cooking apparatus. The stored divider may not be visible from the outside of the cooking apparatus, so that the external aesthetics of the cooking apparatus may be maintained. Also, the tray, on which food may be placed, and which may be detachably mounted in the cooking chamber, may be stored in the divider storage portion which may store the divider.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cooking apparatus comprising:
    a main body;
    a cooking chamber defined in the main body;
    a removable divider placed in the cooking chamber to partition the cooking chamber;
    a divider storage portion to store the divider removed from the cooking chamber; and
    an insulation member provided between the cooking chamber and the divider storage portion, the insulation member including an insulating plate, an air barrier defined between the insulating plate and the divider storage portion, and at least one flow hole formed at a side surface of the air barrier to allow air to flow into and out of the air barrier.

2. The cooking apparatus according to claim 1, wherein the divider has insulating properties to prevent heat transfer between the cooking chambers partitioned by the divider.

3. The cooking apparatus according to claim 1, wherein the divider stored in the divider storage portion is not exposed to the outside of the main body while a drawer is in a closed state.

4. The cooking apparatus according to claim 1,
    wherein the divider is prevented from being affected by the internal condition of the cooking chamber while being accommodated in the divider storage portion, and
    wherein the divider storage portion comprises:
        a divider storage space,
        a divider housing defining the divider storage space, and
        a pair of support ribs arranged at respective lateral sides of the divider storage space to guide the divider into the divider storage space and support the divider.

5. The cooking apparatus according to claim 4, wherein the divider housing is fixably coupled to the main body.

6. The cooking apparatus according to claim 4, wherein each of the support ribs comprises:
    a guide portion which protrudes forward from the divider storage space and has a slanted shape so as to smoothly guide the divider into the divider storage space, and
    a support portion having a flat shape to support the divider retracted into the divider storage space.

7. The cooking apparatus according to claim 4, wherein each of the support ribs comprises a support wall upwardly protruding to guide the divider to be retracted into the divider storage space.

8. The cooking apparatus according to claim 4, wherein each of the support ribs is fixably coupled to the main body.

9. The cooking apparatus according to claim 1, further comprising:
    a bake heater installed between the cooking chamber and
        a drawer receiving space defined beneath the cooking chamber to receive a drawer to emit heat into the cooking chamber.

10. The cooking apparatus according to claim 9, wherein the insulating member is formed between the bake heater and the divider storage space to prevent heat emitted from the bake heater from being transferred to the divider storage space.

11. The cooking apparatus according to claim 10, wherein the air barrier is defined between the insulating plate and the divider housing of the divider storage space.

12. The cooking apparatus according to claim 1, wherein the divider storage space is arranged above a drawer receiving space defined beneath the cooking chamber to receive a drawer.

13. The cooking apparatus according to claim 1, wherein the divider comprises tempered glass.

14. The cooking apparatus according to claim 13, wherein at least one edge of the divider is reinforced.

15. The cooking apparatus according to claim 1, wherein the divider storage portion is further configured to store a tray.

16. A cooking apparatus comprising:
    a main body;
    a cooking chamber defined in the main body;
    a divider detachably mounted in the cooking chamber to partition the cooking chamber;
    a divider storage portion formed in the main body space so that the divider removed from the cooking chamber is slidably retracted and stored therein; and
    an insulation member provided between the cooking chamber and the divider storage portion, the insulation member including an insulating plate and an air barrier defined between the insulating plate and the divider storage portion,
    wherein at least one flow hole is formed at a side surface of the air barrier to allow air to flow into and out of the air barrier.

17. The cooking apparatus according to claim 16, wherein the divider storage portion comprises a divider storage space and a guide comprising a pair of support ribs arranged at respective lateral sides of the divider storage space to guide the divider into the divider storage space and support the divider.

18. The cooking apparatus according to claim 16, wherein the divider storage portion comprises a guide to guide the divider into the divider storage portion and to support the divider.

* * * * *